(12) United States Patent
Elko et al.

(10) Patent No.: US 7,647,396 B2
(45) Date of Patent: *Jan. 12, 2010

(54) SYSTEM, METHOD, AND COMPUTER PROGRAM PRODUCT FOR CENTRALIZED MANAGEMENT OF AN INFINIBAND DISTRIBUTED SYSTEM AREA NETWORK

(75) Inventors: David A. Elko, Austin, TX (US); Daniel H. Lepore, Austin, TX (US); Chetan Mehta, Austin, TX (US); Gregory Francis Pfister, Austin, TX (US); Patrick J. Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/192,597

(22) Filed: Aug. 15, 2008

(65) Prior Publication Data
US 2009/0031017 A1 Jan. 29, 2009

Related U.S. Application Data

(63) Continuation of application No. 10/640,821, filed on Aug. 14, 2003, now Pat. No. 7,421,488.

(51) Int. Cl.
*G06F 15/173* (2006.01)

(52) U.S. Cl. .................................................. 709/223
(58) Field of Classification Search ................. 709/223
See application file for complete search history.

(56) References Cited

U.S. PATENT DOCUMENTS

| 6,810,418 B1 * | 10/2004 | Shah et al. ............... 709/223 |
| 7,185,025 B2 | 2/2007 | Rosenstock et al. | |
| 2003/0103455 A1 * | 6/2003 | Pinto ....................... 370/230 |

FOREIGN PATENT DOCUMENTS

JP 2002269062 A 9/2002

* cited by examiner

*Primary Examiner*—Andrew Caldwell
*Assistant Examiner*—Grant Ford
(74) *Attorney, Agent, or Firm*—Yee & Associates, P.C.; Diana R. Gerhardt

(57) ABSTRACT

A method, system, and product in a data processing system are disclosed for providing centralized management of an INFINIBAND distributed system-area network that includes multiple end nodes. A manager application is established in one of the end nodes. An agent application is established in one or more end nodes. Each agent application is independent from the manager application. The manager application maintains a current list of active agent applications and uses the list to manage the agent applications in the end nodes.

30 Claims, 3 Drawing Sheets

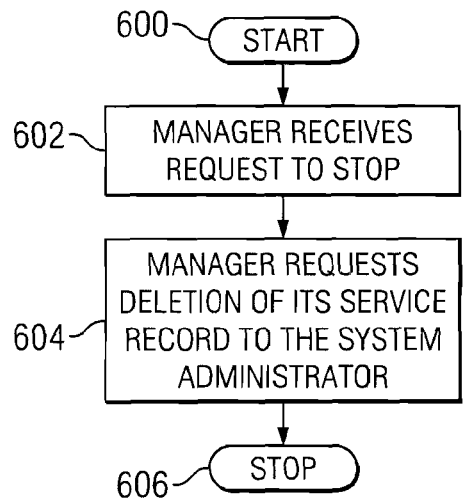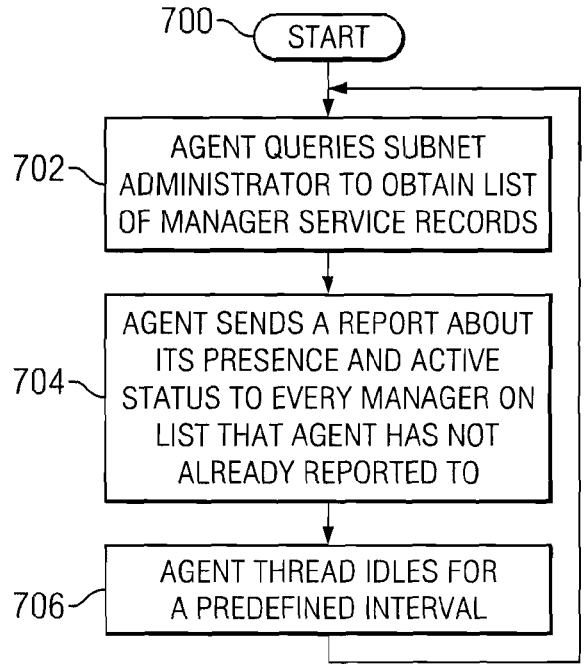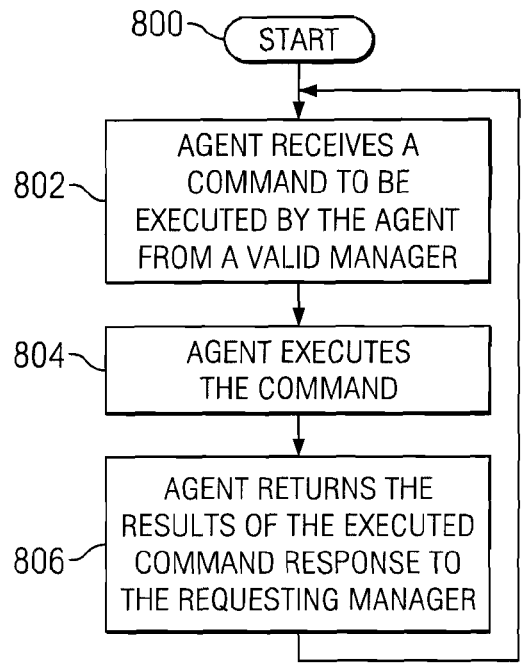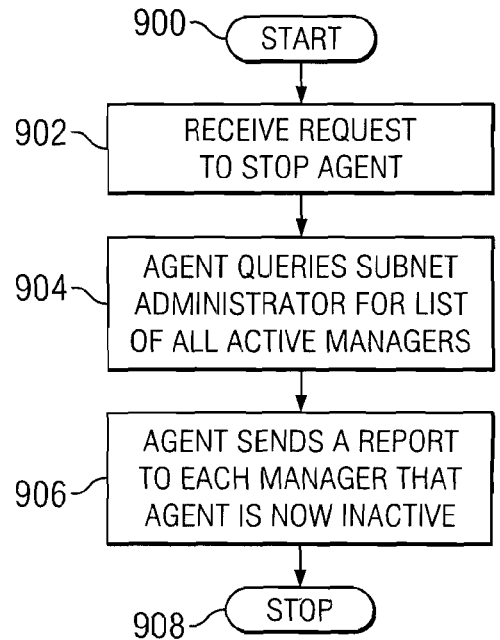

SYSTEM, METHOD, AND COMPUTER PROGRAM PRODUCT FOR CENTRALIZED MANAGEMENT OF AN INFINIBAND DISTRIBUTED SYSTEM AREA NETWORK

This application is a continuation of application Ser. No. 10/640,821, filed Aug. 14, 2003, now U.S. Pat. No. 7,421,488.

BACKGROUND OF THE INVENTION

1. Technical Field

The present invention relates generally to the field of computer systems and more specifically to a system, method, and computer program product for centrally managing INFINIBAND distributed system area network end nodes.

2. Description of Related Art

Historically, increasing compute requirements were addressed by computer manufactures by designing faster uniprocessor systems. As such offerings became cost prohibitive and could not react to the time-to-market requirements, multiple processors were tightly coupled together to create symmetric multi-processor (SMP) systems. Again, driven by higher compute requirements, multiple single or multi-processors were connected together to create a cluster. Clusters of multiple systems provide increased compute capability. However, these clusters often deploy proprietary interconnects to decrease latency and are difficult to manage.

A new industry standard architecture, commonly called "INFINIBAND", has been developed for interconnecting systems in cluster configurations. This new architecture is capable of providing decreased latency, greater bandwidth and increased expandability.

The new architecture provides a system-area network which includes a channel-based, switched-fabric technology. In such a system-area network (SAN), data is transmitted via messages which are made up of packets. Each device, whether it is a processor or I/O device, includes a channel adapter. The messages are transmitted from one device's channel adapter to another device's channel adapter via switches.

INFINIBAND provides an industry standard interconnect for clustering and defines a mechanism for message transfer between end nodes. The Architecture outlines key management requirements for initialization, configuration, and control but limits these requirements only to INFINIBAND components in the fabric (INFINIBAND adapters and switches). Cluster management entails inter-node management requirements also and these are deemed outside the scope of the architecture.

Therefore, a need exists for a method, system, and computer program product for centrally managing INFINIBAND distributed system area network end nodes.

SUMMARY OF THE INVENTION

A method, system, and product in a data processing system are disclosed for providing centralized management of an INFINIBAND distributed system-area network that includes multiple end nodes. At least one manager application is established in one of the end nodes. An agent application is established in one or more end nodes. Each agent application is independent from the manager application. Each manager application registers its presence in the fabric by using INFINIBAND Architected Service Records in the System Administrator (SA) by creating a Service Record in the subnet administrator's database. The agent applications, instead of registering with the subnet administrator, register themselves with one or more manager applications. The manager application maintains a current list of active agent applications and uses the list to manage the agent applications in the end nodes. Agents query the SA to discover any new managers and then register themselves directly with these managers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a high level flow chart which depicts a manager deleting its presence from a subnet administrator in accordance with the present invention;

FIG. 7 depicts a high level flow chart which illustrates an agent registering its presence with managers in accordance with the present invention;

FIG. 8 illustrates a high level flow chart which depicts an agent executing a command received from a manager in accordance with the present invention; and FIG. 9 depicts a high level flow chart which illustrates an agent sending a report to each manager that the agent is now inactive in accordance with the present invention.

DETAILED DESCRIPTION OF THE PREFERRED EMBODIMENT

Figure 1:
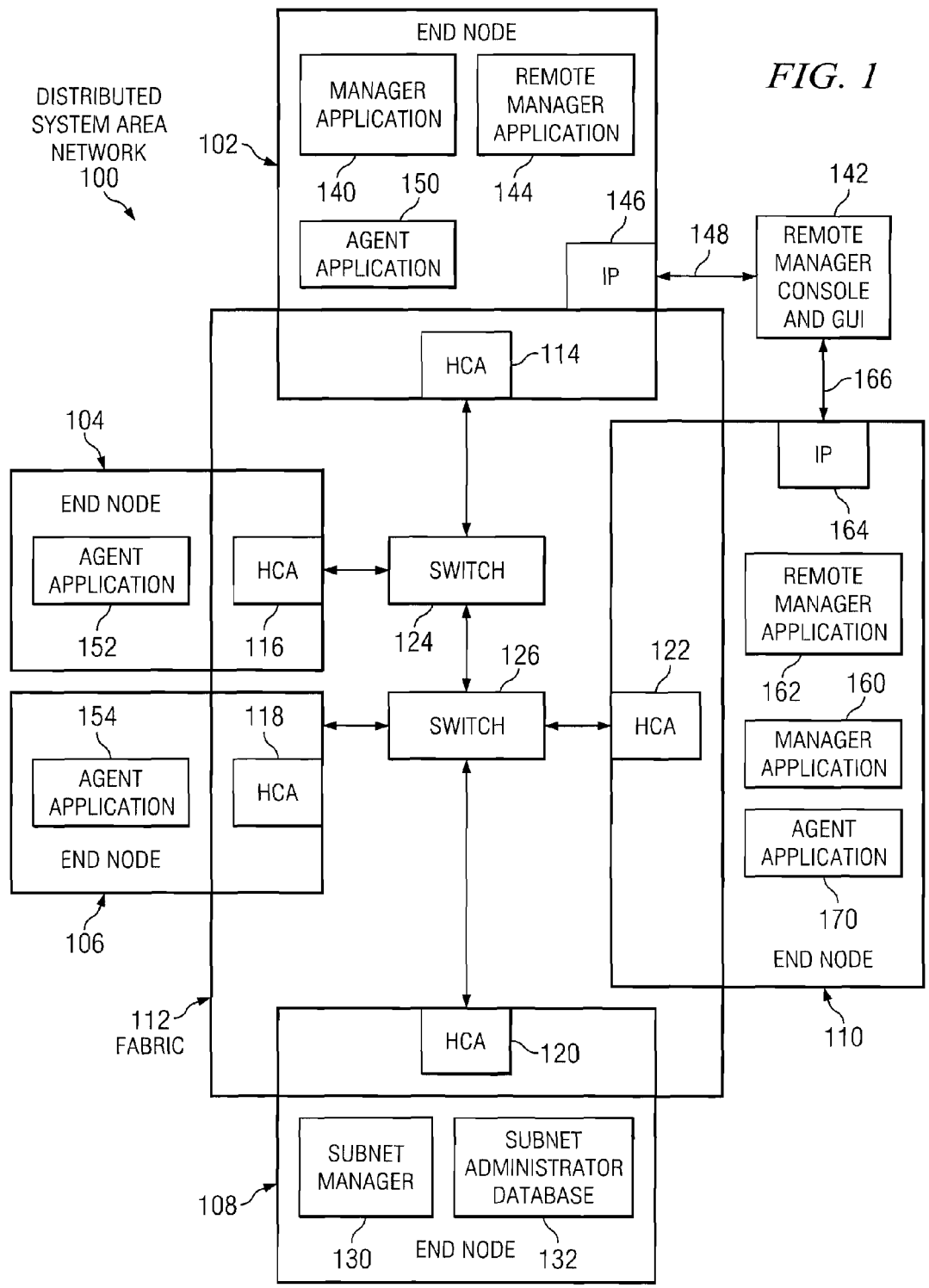
FIG. 1 depicts a data processing system that implements a channel-based, switched fabric architecture for transmitting data in accordance with the present invention.

A preferred embodiment of the present invention and its advantages are better understood by referring to the figures, like numerals being used for like and corresponding parts of the accompanying figures.

The present invention is a method, system, and product in a data processing system for centrally managing the end nodes of a distributed system area network utilizing the INFINBAND fabric. The INFINBAND fabric includes multiple end nodes. One or more manager applications are established in one or more of the end nodes. An agent application is established in one or more end nodes. Each agent application is independent from the manager application.

Each manager application will register its presence with the subnet administrator by creating a Service Record in the subnet administrator's database. Thus, there will be a separate Service Record for each manager that is currently active.

In this manner, each manager will advertise its presence to the rest of the INFINIBAND subnet by creating a Service Record.

Any process within the subnet may determine what applications, such as manager applications, are registered with the subnet administrator as well as further information about where the application is located within the subnet and how to contact it by using an application's Service Record. Since cluster configurations can consist of a large number of nodes, inter-node communications can only proceed if nodes are able to detect and locate each other on the fabric. To facilitate location and discovery, INFINIBAND Architecture defines Service Records can be created by any node wishing to advertise its presence in the fabric. Per the architecture, these Service Records are stored through the Subnet Administrator (SA) in the Subnet Administrator data base (SADB). So in order for an application on one node to be located by other applications on other nodes, following the INFINIBAND standard, the application must be registered with the subnet administrator. Thus, when a first application needs to communicate with a second according to the INFINIBAND standard, the second application needs to be registered with the subnet administrator so that the first application may be aware of the second application's presence and may obtain information about how to locate the second application.

In the subject invention the agent applications will register their presence with each manager instead of registering with the subnet administrator. Thus, the agent applications will not have a Service Record entry in the subnet database.

Each Service Record has an associated lease period. A Service Record remains in the subnet administrator database until the expiration of its associated lease period. When the lease period expires, the Service Record is deleted by the Service Administrator. So when a manager's Service Record is removed, the manager is no longer registered with the subnet administrator.

According to the present invention, when a manager application creates its Service Record, it will obtain a particular lease period. It will be the responsibility of each manager to ensure that they renew their lease with the subnet administrator prior to the expiration of their lease period.

Each agent will use the various Service Records that are maintained by the subnet administrator in the subnet administrator database in order to identify and locate each active manager application. Each agent will then notify each active manager application when the agent becomes active or inactive.

Each manager application will maintain a current list of active agent applications and use the list to route user requested commands to the agent for execution at the end nodes.

FIG. 1 depicts an INFINIBAND distributed storage area network (SAN) 100 in accordance with the present invention. Per INFINIBAND Architecture terminology this is referred to as a "subnet". A subnet is a group of end nodes and cascaded switches that is managed as a single unit. A node is any component attached to one or more links of a network and forming the origin and/or destination of messages within the network. In the depicted example, INFINIBAND subnet 100 includes end nodes 102, 104, 106, 108, and 110. The nodes illustrated in FIG. 1 are for illustrative purposes only, as the subnet 100 can include any number and any type of independent processor nodes and I/O device nodes. "End node" is defined to be a device that includes a channel adapter and can originate or finally consume messages or packets in subnet 100.

Subnet 100 can include the infrastructure supporting both I/O and interprocessor communications (IPC). Subnet 100 includes a switched communications fabric which allows many devices to concurrently transfer data with high-bandwidth and low latency in a secure, remotely managed environment. End nodes can communicate over multiple ports and utilize multiple paths through the subnet 100.

Each node in the subnet 100 includes at least one channel adapter (CA). Subnet 100 (as shown in FIG. 1, fabric equates to subnet) includes host channel adapters (HCAs) 114, 116, 118, 120, and 122, and switches 124 and 126. Each channel adapter is an end point that implements the channel adapter interface in sufficient detail to source or sink packets transmitted utilizing the INFINIBAND fabric 100. A channel adapter included in a processor node is commonly referred to as a host channel adapter (HCA). A channel adapter included in a node other than a processor node is commonly referred to as a target channel adapter (TCA).

Host channel adapters are preferably implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communication protocols.

A switch is a device that connects multiple links together and allows routing of packets from one link to another link within a subnet using a small header Destination Local Identifier (DLID) field. Generally, a switch can route packets from one port to any other port on the same switch.

The fabric is a collection of interconnected switches and end nodes.

One of the nodes of subnet 100 hosts a subnet manager node. For example, end node 108 includes a subnet manager 130 and subnet administrator and its database 132. Subnet manager 130 is used for discovery, configuration, and initialization of the fabric.

Each node needing to be managed includes at least one agent application. In addition, at least one of the nodes includes at least one manager application and a remote manager application. The node including the manager application and remote manager application is coupled to a remote manager console.

For example, end node 102 includes a manager application 140 and a remote manager application 144. End node 102 is coupled to a remote manager console that includes a graphical user interface (GUI) 142.

Remote manager application 144 serves two purposes: at the front end it serves as the external interface for remote console 142, and at the back end it interfaces with manager application 140 to funnel user requests entered via remote manager console 142. Manager application 140 in turn translates requests from remote manager application 144 and forwards them to the appropriate agent applications. The agent applications then perform the services requested by manager application 140.

In the depicted embodiment, end node 102 is coupled to remote manager console 142 using an IP connection 146 and communication link 148 that adheres to the IP protocol. Those skilled in the art will recognize that other types of communications standards, such as Ethernet, might be used to couple end node 102 to remote manager console 142.

Each end node that needs to be managed will include at least one agent application. For example, end node 102 includes agent application 150, end node 104 includes agent application 152, and end node 106 includes agent application 154.

Another end node 110 may be included in SAN 100 that includes a manager application 160 and a remote manager application 162 that is coupled to remote manager console 142 using IP connection 164 and communication link 166. End node 110 may need to be managed and thus includes an agent application 170.

SAN 100 provides the I/O and interprocessor communications (IPC) consumers of the distributed computer system with zero processor-copy data transfers without involving the operating system kernel process, and employs hardware to provide reliable, fault tolerant communications.

At startup, the manager application registers its presence by creating a Service Record for the manager with the subnet administrator. At this point, the manager application may perform one of five different functions:

(1) As client end nodes which host an agent application are started or stopped, the agent application informs the manager application of its entry or exit condition. Thus, each agent will register its presence with the manager application. The manager application then adds the agent to its "Active Agent" list, or removes it from the "Active Agent" list as appropriate. Thereafter, the manager application acknowledges receipt of the entry/exit condition to the agent;

(2) The remote manager requests the list of currently active agents. The manager application "pings", i.e. sends a command to one or more devices or broadcasts a request to all devices, and awaits an acknowledgement of receipt of that command from a device, all of the known agents on its "Active Agents" list to confirm their presence. The manager application then returns the "Active Agents" list to the remote manager;

(3) The remote manager passes a command to the manager application to be executed on all or only a subset of the end nodes. The manager application sends the request to the specified agents. Upon receipt of the responses from the agent application, the responses are returned to the remote application;

(4) The manager application reregisters itself at periodic intervals before expiration of a finite lease period; and (5) If the manager application is being stopped, such as when an end node on which the manager application is being shut down, the manager application deletes its Service Record from the subnet administrator.

The functions of any agent application may be one of three functions:

(1) After the agent is started, it queries the subnet administrator to obtain a list of manager application Service Records. For every new manager, i.e. not previously contacted by the agent to report presence in this session, the agent application registers its presence via an Entry condition. This thread of the agent idles or sleeps for a predefined interval and then repeats the cycle for any new managers that have registered themselves with the Subnet Administrator. This function is necessary in order to inform any managers that initiated after an agent has begun execution and also to discover and remove managers that are no longer active;

(2) An agent application receives a command from a valid manager. The agent executes the command on its end node and returns the results of the execution of the command to the manager as the agent's response; and (3) The agent application is being stopped, such as when the user shuts down the end node on which the agent is executing. The agent application queries the subnet administrator to obtain a list of all active manager applications. The agent application reports its Exit condition to each of the active managers. Upon a successful acknowledgment, the agent application terminates.

The managers and agents are independent of each other. Managers can be changed, started, stopped, or moved without affecting the agents or their end nodes. A manager application manages all of the active agent applications without adding overhead to the subnet administrator. The subnet administrator does not manage the agent applications. Each manager application manages the agent applications.

Figure 2:
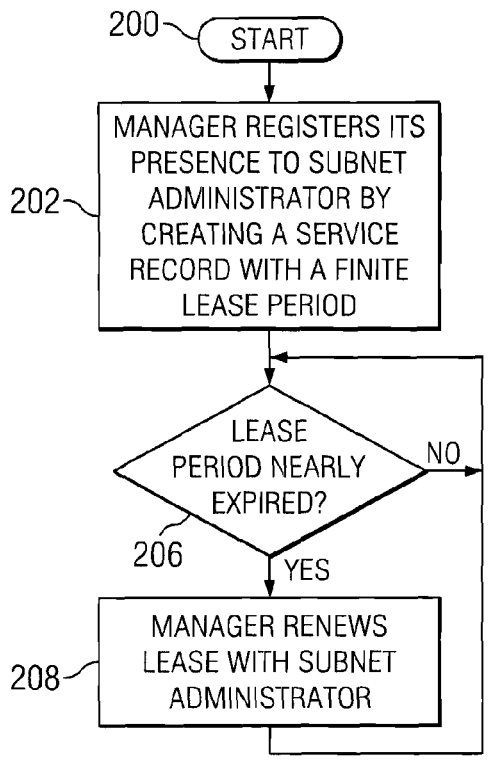
FIG. 2 illustrates a high level flow chart which depicts a manager registering its presence with a subnet administrator in accordance with the present invention.

FIG. 2 illustrates a high level flow chart which depicts a manager registering its presence with a subnet administrator in accordance with the present invention. The process starts as depicted by block 200 and thereafter passes to block 202 which illustrates a manager application registering its presence with the subnet administrator by creating a Service Record having a finite lease period through the subnet administrator for the manager application. Thus, the subnet administrator will include a Service Record for each registered manager application. Next, block 206 illustrates a determination of whether or not the lease period is about to expire. If a determination is made that the lease period is not about to expire, the process passes back to block 206. Referring again to block 206, if a determination is made that the lease period is about to expire, the process passes to block 208 which depicts the manager application renewing its lease with the subnet administrator. The process then passes back to block 206.

Figure 3:
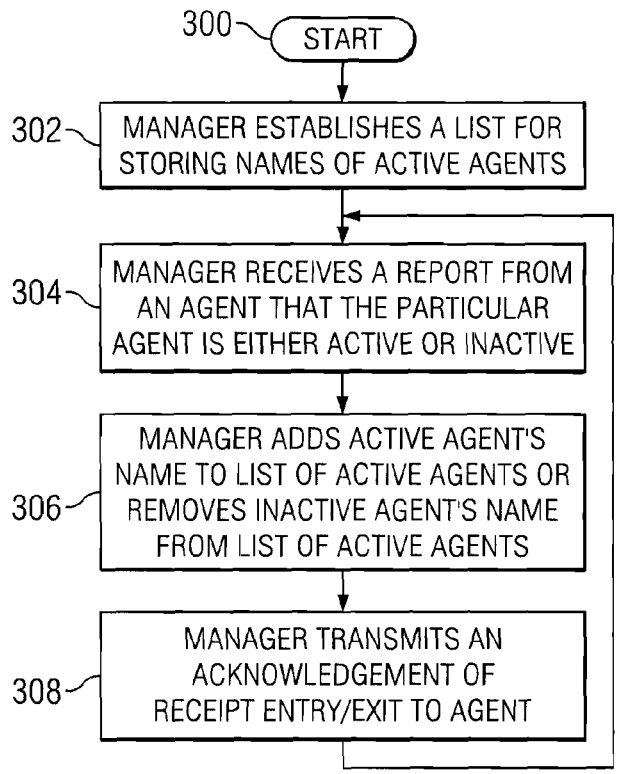
FIG. 3 depicts a high level flow chart which illustrates a manager maintaining a list of active agents in accordance with the present invention.

FIG. 3 depicts a high level flow chart which illustrates a manager application maintaining a list of active agent applications in accordance with the present invention. The process starts as illustrated by block 300 and thereafter passes to block 302 which depicts a manager establishing a list for storing the names of active agents. Next, block 304 illustrates the manager receiving a status report from an agent that the particular agent is either active or inactive. Block 306, then, depicts the manager either adding this agent's name to the list of active agents (if the agent reported itself as active) or removing the agent's name from the list (if the agent reported itself as becoming inactive). Thereafter, block 308 illustrates the manager transmitting an acknowledgment of receipt of the entry/exit to the agent. The process then passes back to block 304.

Figure 4:
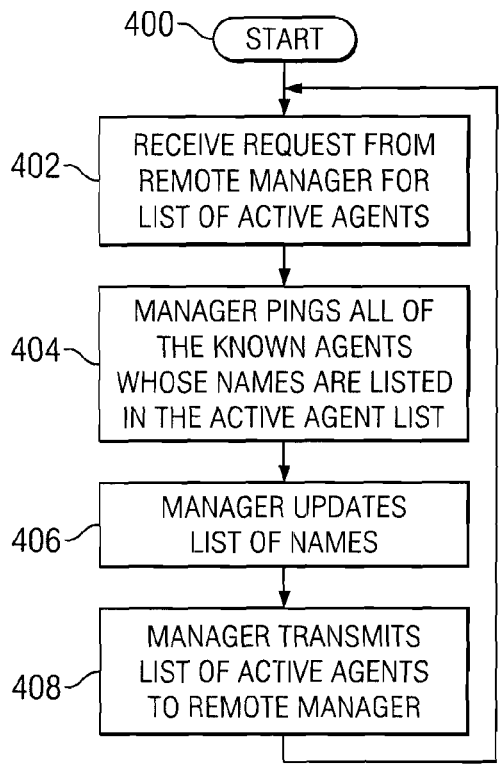
FIG. 4 illustrates a high level flow chart which depicts a manager identifying active agents in accordance with the present invention.

FIG. 4 illustrates a high level flow chart which depicts a manager identifying active agents in accordance with the present invention. The process starts as depicted by block 400 and thereafter passes to block 402 which illustrates a manager receiving a request from the remote manager for the list of the active agents. Next, block 404 depicts the manager pinging all of the known agents whose names are listed in the active agent list to confirm their presence. Thereafter block 406 depicts the manager updating the list as appropriate to include the names of all active agents. Thus, the manager application will include the names of all agents that replied to the "ping" that the agent is active. The manager application will also remove the names of all agents from the list that fail to respond. Block 408, then, illustrates the manager transmitting the list of the names of the active agents to the remote manager. The process then passes back to block 402.

Figure 5:
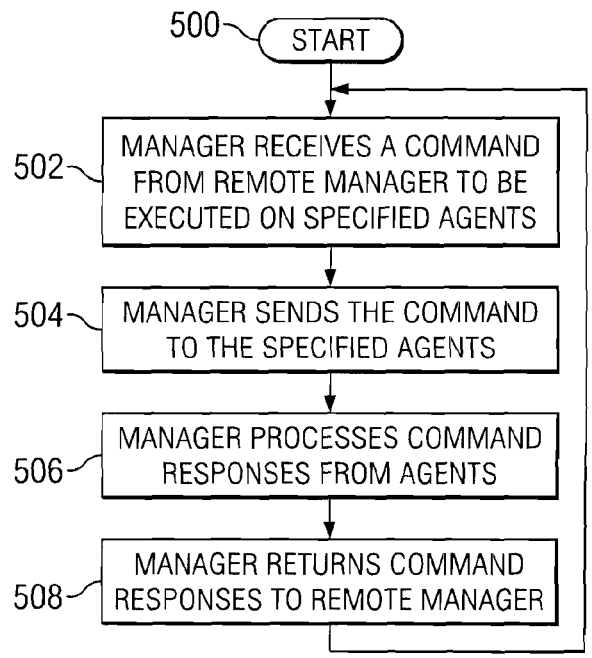
FIG. 5 depicts a high level flow chart which illustrates a manager sending a command to an agent to be processed in accordance with the present invention.

FIG. 5 depicts a high level flow chart which illustrates a manager sending a command to an agent to be processed in accordance with the present invention. The process starts as depicted by block 500 and thereafter passes to block 502 which illustrates a manager receiving a command from the remote manager that is to be executed on one or more specified agents. Next, block 504 depicts the manager sending the command to the specified agents. Block 506, then, illustrates the manager processing the responses from the agents. These responses are generated by the agents in response to executing the command. Thereafter, block 508 depicts the manager returning the command responses to the remote manager. The process then passes back to block 502.

FIG. 6 illustrates a high level flow chart which depicts a manager deleting its presence from a subnet administrator in accordance with the present invention. The process starts as depicted by block 600 and thereafter passes to block 602 which depicts a manager receiving a request to stop the manager application. Next, block 604 illustrates the manager requesting the deletion of this manager's Service Record to the subnet administrator. The process then terminates as depicted by block 606.

FIG. 7 depicts a high level flow chart which illustrates an agent sending a report about the agent's active or inactive status to a manager in accordance with the present invention. The process starts as depicted by block 700 and thereafter passes to block 702 which illustrates an agent querying the subnet administrator to obtain the list of manager service records. Next, block 704 depicts the agent sending a report about its presence and active status to every manager on the list that the agent has not already reported to. Thus, the agent is registering with these managers. Block 706, then, illustrates this reporting agent thread idling for a predefined time period. The process then passes back to block 702.

FIG. 8 illustrates a high level flow chart which depicts an agent executing a command received from a manager in accordance with the present invention. The process starts as depicted by block 800 and thereafter passes to block 802 which illustrates an agent receiving a command to be executed by the agent from a valid manager. Next, block 804 depicts the agent executing the command. Block 806, then, illustrates the agent returning the results of the executed command to the requesting manager. The process then passes back to block 802.

FIG. 9 depicts a high level flow chart which illustrates an agent sending a report to each manager that the agent is now inactive in accordance with the present invention. The process starts as depicted by block 900 and thereafter passes to block 902 which illustrates receiving a request to stop an agent. Next, block 904 illustrates the agent querying the subnet administrator for the list of Service Records in order to identify all active managers. Block 906, then, depicts the agent sending a report to each manager that this particular agent is now inactive. The process then terminates as illustrated by block 908.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for providing centralized management of a channel-based switched-fabric distributed system-area network that includes a subnet administrator and a plurality of end nodes, said system comprising:

a manager application registering its presence in said network by registering with said subnet administrator in a subnet end node that includes a subnet manager;

said manager application not included within a channel adapter;

said manager application executing within a first end node, wherein the first end node is not the subnet end node;

each one of a plurality of agent applications registering its presence with said manager application, none of said plurality of agent applications registering in said subnet end node with said subnet administrator;

said plurality of agent applications executing within second end nodes, wherein said second end nodes do not include either the first end node or the subnet end node;

said plurality of agent applications not included within a channel adapter; and said manager application for publicizing a presence of each one of said plurality of agent applications to said network, said presence of each one of said plurality of agent applications in said network required to be publicized before other applications are able to communicate with each one of said plurality of agent applications;

said system-area network including a remote manager console that is coupled to the first end node using a protocol that is not included in said switched fabric;

a remote manager application and a particular manager application included in said first end node;

said remote manager application acting as an external interface for said remote manager console;

said remote manager application funneling a user request to said particular manager application;

said user request entered via said remote manager console;

said particular manager application forwarding said user request to at least one particular one of said plurality of agent applications; and responsive to receipt, by said particular manager application, of a response to said user request from said at least one particular one of said plurality of agent applications, said particular manager application forwarding said response to said remote manager application.

2. The system according to claim 1, further comprising:

said particular manager application maintaining a list of registered ones of said plurality of agent applications that are currently registered with said particular manager application;

said particular manager application utilizing said list to manage said registered ones of said plurality of agent applications;

said particular manager application receiving, from said remote manager application, a request for a list of active ones of said plurality of agent applications;

said particular manager application pinging all of said registered ones of said plurality of agent applications;

ones of said plurality of agent applications that respond to said pinging being active ones of said plurality of agent application; and said particular manager application transmitting, to said remote manager application, a list of said active ones of said plurality of agent applications that responded to said pinging.

3. The system according to claim 1, further comprising:
establishing means for establishing said manager application in one of said plurality of end nodes.

4. The system according to claim 1, further comprising:
said manager application receiving a user command to be executed by specified ones of said plurality of agent applications;
said manager application sending said user command to said specified ones of said plurality of agent applications; and
said manager application receiving a response from said specified ones of said agent applications in response to said specified ones of said agent applications executing said user command.

5. The system according to claim 1, further comprising:
said manager application registering its presence in said network with said subnet administrator by creating a Service Record in said subnet administrator's database in said subnet end node.

6. The system according to claim 1, further comprising:
a command being broadcast by said manager application to identify said plurality of agent applications.

7. The system according to claim 1, further comprising:
said manager application receiving a report from ones of said plurality of agent applications that identifies an active/inactive status for said ones of said plurality of agent applications.

8. The system according to claim 1, further comprising:
said subnet manager maintaining a list of all manager applications that are registered with said subnet administrator;
one of said plurality of agent applications obtaining said list;
said one of said plurality of agent applications registering its presence with each one of said manager applications that are included in said list.

9. The system according to claim 1, further comprising:
one of said plurality of agent applications receiving a request to stop executing;
transmitting means for transmitting to said manager application a notice that said one of said plurality of agent applications will be stopped; and
said manager application removing a registration of a presence of said one of said plurality of agent applications.

10. The system according to claim 2, further comprising:
said list of registered ones of said plurality of agent applications updated to include only said active ones of said plurality of agent applications.

11. The system according to claim 4, further comprising:
said manager application maintaining a current list of active agent applications; and
said manager application utilizing said list to locate said specified ones of said plurality of agent applications.

12. The system according to claim 5, further comprising:
a lease period associated with said Service Record, said Service Record being automatically deleted from said database upon an expiration of said lease period.

13. The system according to claim 7, further comprising:
said manager application adding a name of each active one of said plurality of agents to a list that is maintained by said manager application of active agents; and
said manager application removing a name of each inactive one of said plurality of agents from said list.

14. The system according to claim 12, further comprising:
said manager application re-registering its presence in said network with said subnet administrator prior to an expiration of said lease period.

15. The system according to claim 13, further comprising:
said manager application sending a confirmation command to each active one of said plurality of agent applications to confirm a status of each active one of said plurality of agent applications;
said manager application receiving replies to said confirmation command; and
said manager application updating said list.

16. A computer program product for providing centralized management of a channel-based switched-fabric distributed system-area network that includes a subnet administrator and a plurality of end nodes, said product comprising:
instruction means for registering, by a manager application, its presence in said network by registering with said subnet administrator in a subnet end node that includes a subnet manager;
said manager application not included within a channel adapter;
said manager application executing within a first end node, wherein the first end node is not the subnet end node;
instruction means for registering, by each one of a plurality of agent applications, its presence with said manager application, none of said plurality of agent applications registering in said subnet end node with said subnet administrator;
said plurality of agent applications executing within second end nodes, wherein said second end nodes do not include either the first end node or the subnet end node;
said plurality of agent applications not included within a channel adapter; and
instruction means for publicizing a presence of each one of said plurality of agent applications to said network by said manager application, said presence of each one of said plurality of agent applications in said network required to be publicized before other applications are able to communicate with each one of said plurality of agent applications;
said system-area network including a remote manager console that is coupled to the first end node using a protocol that is not included in said switched fabric;
including a remote manager application and a particular manager application in said first end node;
said remote manager application acting as an external interface for said remote manager console;
instruction means for funneling, by said remote manager application, a user request to said particular manager application;
said user request entered via said remote manager console;
instruction means for forwarding, by said particular manager application, said user request to at least one particular one of said plurality of agent applications; and
responsive to receipt, by said particular manager application, of a response to said user request from said at least one particular one of said plurality of agent applications, instruction means for forwarding said response from said particular manager application to said remote manager application.

17. The product according to claim 16, further comprising:
instruction means for maintaining, by said particular manager application, a list of registered ones of said plurality of agent applications that are currently registered with said particular manager application;

instruction means for utilizing said list by said particular manager application to manage said registered ones of said plurality of agent applications;

instruction means for receiving, by said particular manager application from said remote manager application, a request for a list of active ones of said plurality of agent applications;

instruction means for pinging, by said particular manager application, all of said registered ones of said plurality of agent applications;

ones of said plurality of agent applications that respond to said pinging being active ones of said plurality of agent application; and instruction means for transmitting, by said particular manager application to said remote manager application, a list of said active ones of said plurality of agent applications that responded to said pinging.

18. The product according to claim 16, further comprising:
instruction means for establishing said manager application in one of said plurality of end nodes.

19. The product according to claim 16, further comprising:
instruction means for receiving, by said manager application, a user command to be executed by specified ones of said plurality of agent applications;

instruction means for sending said user command from said manager application to said specified ones of said plurality of agent applications; and instruction means for receiving within said manager application a response from said specified ones of said agent applications in response to said specified ones of said agent applications executing said user command.

20. The product according to claim 16, further comprising:
instruction means for registering, by said manager application, its presence in said network with said subnet administrator by creating a Service Record in said subnet administrator's database in said subnet end node.

21. The product according to claim 16, further comprising:
instruction means for broadcasting a command by said manager application to identify said plurality of agent applications.

22. The product according to claim 16, further comprising:
instruction means for receiving by said manager application a report from ones of said plurality of agent applications that identifies an active/inactive status for said ones of said plurality of agent applications.

23. The product according to claim 16, further comprising:
instruction means for maintaining, by said subnet manager, a list of all manager applications that are registered with said subnet administrator;

instruction means for obtaining, by one of said plurality of agent applications, said list;

instruction means for registering, by said one of said plurality of agent applications, its presence with each one of said manager applications that are included in said list.

24. The product according to claim 16, further comprising:
instruction means for receiving, within one of said plurality of agent applications, a request to stop executing;

instruction means for transmitting to said manager application a notice that said one of said plurality of agent applications will be stopped; and instruction means for removing, by said manager application, a registration of a presence of said one of said plurality of agent applications.

25. The product according to claim 17, further comprising:
instruction means for updating said list of registered ones of said plurality of agent applications to include only said active ones of said plurality of agent applications.

26. The product according to claim 19, further comprising:
instruction means for maintaining, by said manager application, a current list of active agent applications; and instruction means for utilizing said list by said manager application to locate said specified ones of said plurality of agent applications.

27. The product according to claim 20, further comprising:
instruction means for associating a lease period with said Service Record, said Service Record being automatically deleted from said database upon an expiration of said lease period.

28. The product according to claim 22, further comprising:
instruction means for adding, by said manager application, a name of each active one of said plurality of agents to a list that is maintained by said manager application of active agents; and instruction means for removing, by said manager application, a name of each inactive one of said plurality of agents from said list.

29. The product according to claim 27, further comprising:
instruction means for re-registering, by said manager application, its presence in said network with said subnet administrator prior to an expiration of said lease period.

30. The product according to claim 28, further comprising:
instruction means for sending, from said manager application, a confirmation command to each active one of said plurality of agent applications to confirm a status of each active one of said plurality of agent applications;

instruction means for receiving, by said manager application, replies to said confirmation command; and instruction means for updating, by said manager application, said list.

* * * * *